United States Patent [19]

Hemmersbach et al.

[11] Patent Number: 5,649,800

[45] Date of Patent: Jul. 22, 1997

[54] CONTAINER TRANSFER DEVICE

[75] Inventors: Siegfried Hemmersbach, Köln; Heinz May, Pulheim, both of Germany

[73] Assignee: Finn-Aqua GmbH, Hurth, Germany

[21] Appl. No.: 335,875

[22] PCT Filed: May 13, 1993

[86] PCT No.: PCT/EP93/01198

§ 371 Date: Feb. 9, 1995

§ 102(e) Date: Feb. 9, 1995

[87] PCT Pub. No.: WO93/23319

PCT Pub. Date: Nov. 25, 1993

[30] Foreign Application Priority Data

May 13, 1992 [DE] Germany .............. 42 15 781.1

[51] Int. Cl.$^6$ ..................... B65G 47/66
[52] U.S. Cl. ............... 414/180; 414/215; 198/600; 34/236
[58] Field of Search .................. 414/152, 172, 414/180, 215, 791.6, 799, 798.7, 331; 14/69.5, 73.5; 198/600, 635, 463.2, 592; 34/236, 237; 296/57.1, 61

[56] References Cited

U.S. PATENT DOCUMENTS

| 1,858,732 | 5/1932 | Farnham | 198/635 |
| 2,536,756 | 1/1951 | Lopez | 414/152 |
| 2,587,265 | 2/1952 | Wright | 296/61 |
| 3,138,812 | 6/1964 | Prosser | 14/69.5 |
| 3,251,458 | 5/1966 | Niekamp et al. | 198/635 |
| 4,457,662 | 7/1984 | Ireland et al. | 414/331 |
| 4,634,333 | 1/1987 | Butterly, Jr. et al. | 414/331 |
| 4,815,921 | 3/1989 | Yamamoto et al. | 414/331 |
| 5,287,579 | 2/1994 | Estevez, Jr. | 296/61 |

FOREIGN PATENT DOCUMENTS

| 0391208 | 10/1990 | European Pat. Off. . |
| 1571566 | 5/1969 | France . |
| 2453781 | 11/1980 | France . |

Primary Examiner—Karen B. Merritt
Assistant Examiner—Gregory A. Morse
Attorney, Agent, or Firm—Harris Beach & Wilcox, LLP

[57] ABSTRACT

A table for the transfer of fragile materials such as containers of freeze dried products, flasks, or the like, has a slide that displaces horizontally on the surface of the table. The table has a marginal section including a plurality of marginal tongues that independently pivot about an axis parallel to the edge of the table surface. The containers are moved from the surface of the transfer table across the tongues onto a support surface, or vice versa.

11 Claims, 2 Drawing Sheets

5,649,800

CONTAINER TRANSFER DEVICE

BACKGROUND OF THE INVENTION

In modern freeze-drying units, sterilization facilities (autoclaves) etc. there is the necessity of loading a plurality of containers, flasks and the like onto a support surface and, after performing the respective treatment (freeze drying, sterilization, etc.), removing these from the support surface.

The prerequisite for trouble-free transfer of the containers from the surface of the table to the support surface—or vice-versa—is the absence of any steps or reliefs on the transfer surface. But the larger the support surface, the more difficult it is to manufacture with perfectly straight, smooth edges. This is particularly true for support surfaces in freeze-drying, as these consist of several parts welded together which have cavities, through which a cooling agent and then a heating agent flow during the freeze drying process. Some unevenness arising during manufacture and/ or as a result of temperature loads can therefore not be totally avoided.

A transfer table of the type mentioned at the beginning is known for ER-A-391 208. The swivelling marginal section over which the containers are moved from the surface of the transfer table to a support surface, or vice-versa is supposed to ensure trouble-free transfer of the containers. This aim cannot be realized when the front edge of the support surface is not flat or even. In spite of having a swivelling marginal section, uneven areas are formed which may even cause the containers to tip over causing damage to the containers.

The basis of the present invention is to further develop the design of a transfer table of the type mentioned above such that trouble-free transfer of the containers from the surface of the transfer table to other support surfaces is guaranteed.

SUMMARY OF THE INVENTION

The invention concerns a device for transferring a plurality of containers, flasks or the like with the generic features of the device for transferring containers to and from at least one support surface comprising:

a transfer table having a top planar surface; and means for moving said top surface toward said at least one support surface, wherein said top surface includes a hinged portion at one end which is pivotable about an axis parallel to an edge of said top surface and in which said hinged portion includes a plurality of independently pivotable tongues, each being pivotable about said axis for aligning with a corresponding edge of said at least one support surface to allow the transfer of containers between said transfer table and said at least one support surface.

In accordance with the invention this design is realized by subdividing the marginal section of the transfer table into a plurality of tongues which can independently swivel around the axis extending parallel to the edge of the transfer table. This measure makes it possible for the edge of the transfer table to be much better matched to an uneven front edge of a support surface, such that there is no longer any significant difference in height between the support surface and the transfer table surface.

Although it has been known for some time now that the swivelling edges of loading ramps for trucks have been subdivided into several sections (FR-A-15 71 566 and FR-A-24 53 781), references to the effect that transfer tables of the type in question be equipped with a plurality of tongues for the purpose of trouble-free transfer of flasks, were not contained in this far-removed prior art.

DESCRIPTION OF THE DRAWINGS

Further advantages and details of the invention are to be elucidated using the examples depicted in FIGS. 1 to 6, in which.

DESCRIPTION OF THE INVENTION

Figure 1:
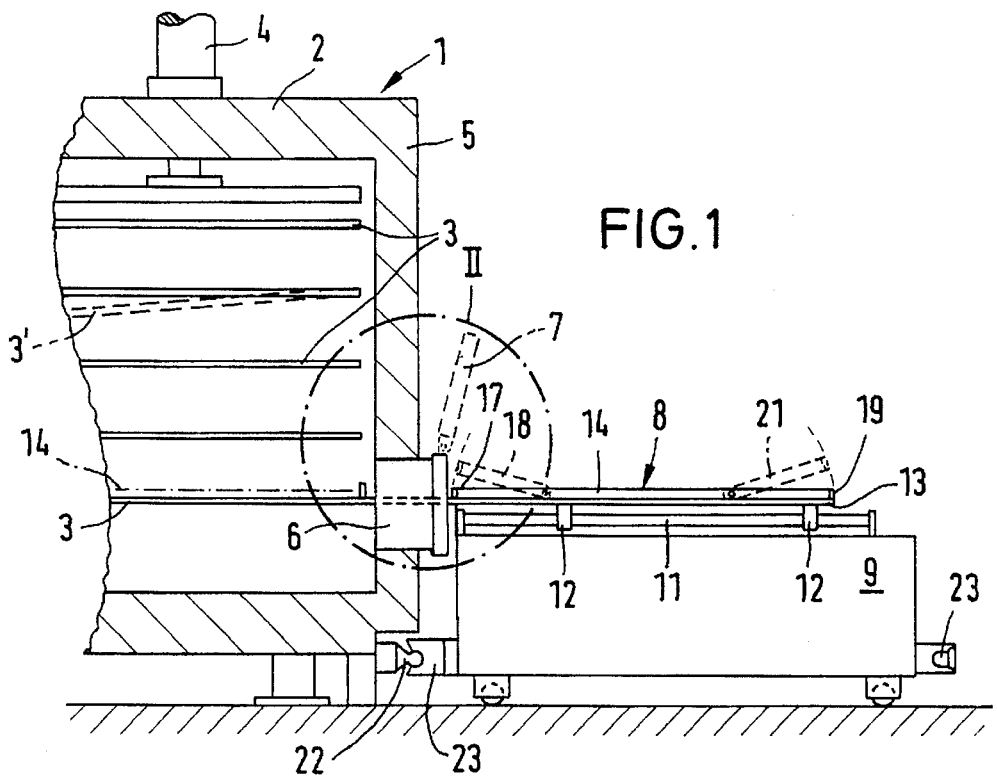
FIG. 1 shows a cross-section through a freeze-drying unit with a transfer table located in front of it.

In FIG. 1 a freeze-drying unit is now described as an example of a facility with containers being charged and/or discharged and designated 1. It includes a chamber 2, in which support surfaces 3 are housed. The height of these support surfaces can be adjusted with the aid of a cylinder piston device 4, which is not more closely detailed. On the one hand, this height adjustment facility permits the support surfaces 3 to be set to a certain charging height. Secondly, with the aid of the cylinder piston device 4, the support surfaces 3 can be shifted closer together to close the containers after the freeze drying procedure has been completed.

One wall 5 of the chamber 2 is provided with a mouth 6, which can be shut with the flap 7. In front of the freeze-drying unit 1 at the level of the mouth 6 there a transfer table 8, which is supported on the charging trolley 9 above the horizontal spindle 11 and the spindle nuts 12. The transfer table 8 includes the actual table surface 13 and the slide 14, which itself is arranged in the manner shown in EP-A-391 208 such that, though not depicted with respect to the table surface 13, it can be moved back and forth beyond the front side of the transfer table 8 in the manner shown in as EP-A-391 208.

Figure 2:
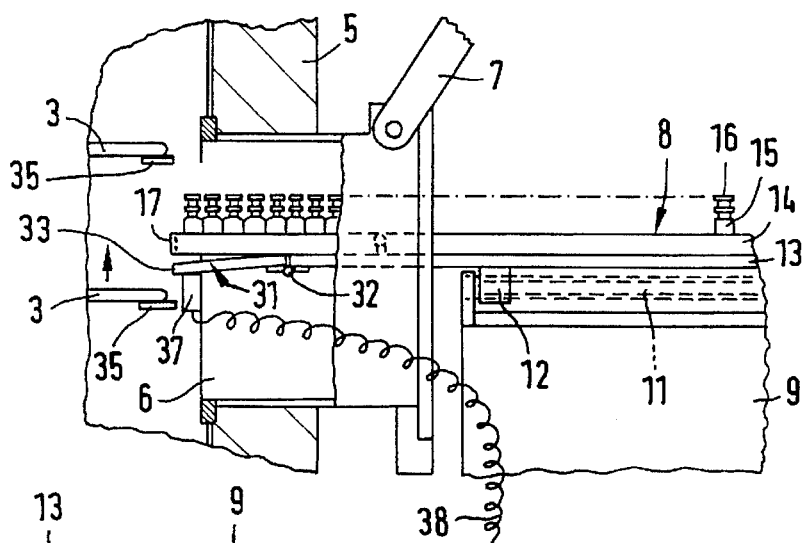
FIG. 2 shows an enlarged view of the transfer area between the transfer table and the support surface as specified in FIG. 1.

FIG. 2 is an enlarged view of the area of the mouth 6 in the chamber wall 5. The spindle guides 11 and 12 are extended such that the transfer table 8 can be moved up to the support surface 3 to be loaded, in such a manner that the top of this support surface 3 and the table surface 13 of the transfer table 8 constitute a single plane. The slide 14, which includes the containers 15 located on the transfer table 8 with loosely fitted stoppers 16, can be slid into the interior of the freeze-drying chamber 1 across the face of the transfer table (see FIG. 1, in which the inserted slide is depicted as a dashed line). The edge 17 of the slide facing the mouth 6 in the chamber wall 5, in the position according to FIG. 1, can be lifted with a pair of side arms see the positions respectively outlined). Once the slide 14 has been inserted completely into the chamber 2, the raising of the slide edge 17 is depicted first—in dashes—and then the withdrawal of the slide 14. The containers 15 remain on the support surface 3. Subsequently, the charging of the next support surface 31 can be started or, if the last support surface has been filled up, the flap 7 is closed and the freeze drying process can be commenced.

In order to charge a further support surface 3, the transfer table 8 is filled again with containers 15. This can be carried out by rolling the charging trolley 9 up to a formatting table (not shown) which, for example can be arranged opposite the mouth 6. The transfer table 8 is then positioned in front of the formatting table. In order to be able to take up the flasks on the formatting table using the slide 14, the edge 19 of the slide 14 also opposite the edge 17 can be lifted with the aid of the side arms 21. The movement of the slide 14 is then carried out with edge 19 raised. Once the slide 14 has taken up all of the containers from the suitably sized table, the edge 19 is lowered and the slide 14 is pulled back such that all of the containers are slid onto the surface to the transfer table 8.

Centering bolt 22 and guide blocks 23 are provided to ensure that the charging trolley 9 is correctly positioned in front of the freeze-drying unit 1 or possibly also in front of the suitably sized table. There is the possibility of adjusting the height of the transfer table 8, if support surfaces 3 having different heights have to be loaded. Thus, the dead space in the freeze-drying changer 1 can be kept to a minimum. The size of mouth. 6 has to be dimensioned correspondingly. Furthermore, the transfer table 8 can also be supported on the charging trolley 9 such that it can be rotated freely. Then it suffices when only one of the edges 17, 19 of the slide 14 can be raised, as then only the respective raisable edge can be positioned facing the suitably sized table or the support surface 3 to be charged or discharged.

Figure 3:
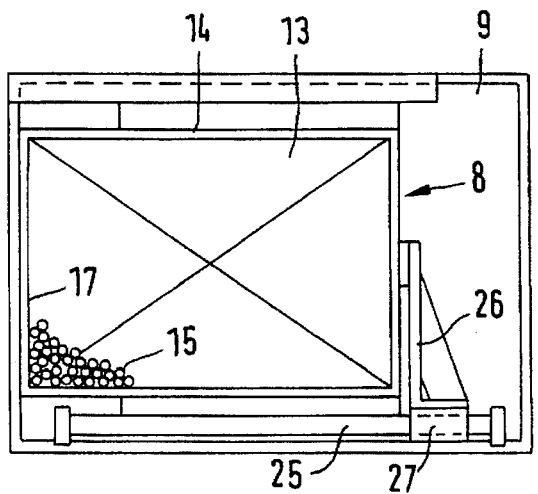
FIG. 3 shows a top view of the transfer table of FIG. 1.

The back and forth movement of the slide 14 is also preformed with a spindle guide 25, depicted in FIG. 3, and arranged to the side of transfer table 8. The slide 14 is guided back and forth in a sliding motion on the spindle 25 via the spindle nut 27 and the bracket 26, which is solidly attached to the slide 14. The slide 14 itself is equipped with rollers, which are not depicted in the figures. These are supported by the edges of the transfer table 13, which simultaneously function as runners for the rollers.

For a trouble-free transfer of the containers 15 on the surface of the transfer table 8 and from this to the support surfaces 3 (and vice-versa) it is required that respective adjacent surfaces form a flat surface. It has already been suggested that the table surface 13 of the transfer table 8 be equipped with a marginal section 31, which faces the respective table or support surface 3 to be loaded or unloaded and that it be attached to the main section of the table surface 13 via a joint 32 in such a manner that the height of the free corner of section 31 can be adjusted. In this solution, stoppers are attached to the section 31 and define the position of the surface of the transfer table 8. The stoppers are attached on the side of the section in such a way that they do not impair the transfer of the containers.

Figure 4:
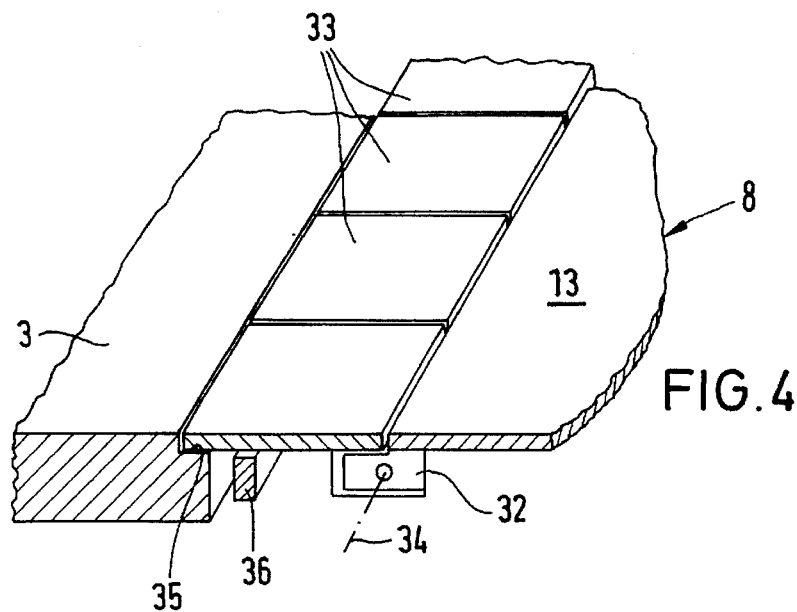
FIGS. 4–6 show variations for the design of the transfer area.
Figure 5:
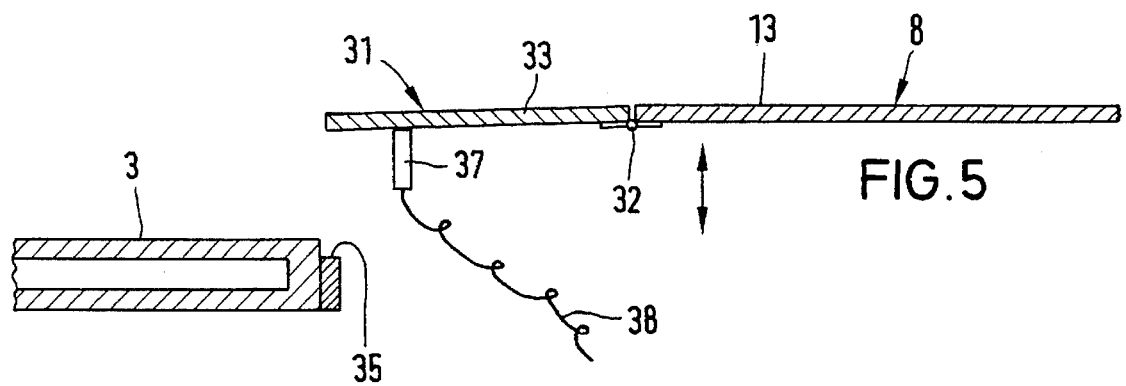
Figure 6:
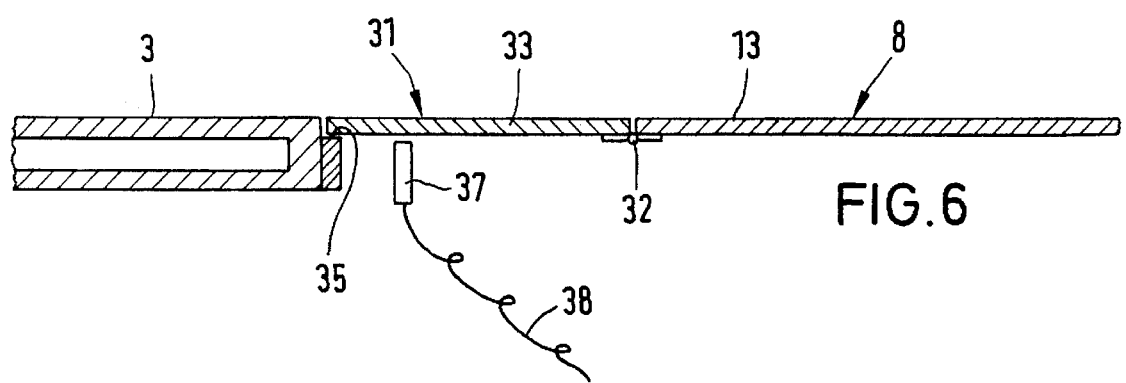

Referring to FIGS. 4–6, the swiveling marginal section 31 of the transfer table 8 is subdivided into a plurality of tongues 33, each of which can independently pivot around an axis 34 disposed parallel to the edge of the table surface 13 (see in particular FIG. 3). These tongues 33 have been provided with suitable stop faces 35, which have been designed and mounted to the support surfaces 3 such that when the tongues 33 are placed on top of these stop faces 35, they fit flush with the front edges of the support surfaces 3.

In the examples illustrated in FIGS. 4 to 6, the(front) edge of the support surface 3 facing the transfer table 8 is equipped with a step as a stopper, which has a height corresponding to the thickness of the tongues 33. When the tongues 33 are lying on the step 35 (FIGS. 4 and 6), a virtually flat transfer surface is produced between the table surface 13 of the transfer table 8 and the top of the support surface 3, even when the front edge of the support surface 3 is not exactly level.

The stop face or step 35 is formed by metal rails (not shown) attached to the support surfaces 3 (FIGS. 2 and 4). However, there is also the possibility of cutting it into the front edges of the support surfaces 3 (FIG. 4).

In operation, the transfer table 8 is moved up to a support surface 3 such that it is initially slightly higher than the support surface (FIG. 5). In this position of the transfer table 8 the tongues 33 are lying on a support ledge 36 connected to the table and running under the tongues (FIG. 4). Still the inclination of the tongues 33 is so slight that there is no danger of the containers 15 tipping over. The transfer table 8 is then lowered downwardly until the tongues 33 rest on the step 35.

The downward motion of the transfer table 8 can be controlled by a proximity switch 37 (FIGS. 2, 5 and 6) located underneath one of the tongues 33. This proximity switch can be part of the support ledge 36 (FIG. 3). The proximity switch 37 is connected to a control module 39 (FIG. 2) via a connecting lead 38. Using this control module 39, the downward motion of the transfer table 8 or the upward motion of the support surfaces 3 can be controlled using the cylinder piston facility 4 (FIG. 1).

What is claimed is:

1. In combination with a chamber having at least one support surface, a device for transferring containers comprising:

a transfer table having a top planar section having a hinged marginal portion at one end and a planar portion at a remaining end; and means for moving said transfer table relative to said at least one support surface in the chamber, wherein said hinged portion is pivotable about an axis parallel to an edge of said top section and in which said hinged portion includes a plurality of independently pivotable tongues, each said tongue being pivotable about said axis for aligning with a corresponding edge of said at least one support surface to allow the transfer of containers between said transfer table and said at least one support surface when said moving means moves said transfer table, at least one support surface having a plurality of stops that align with said plurality of tongues, and in which said stops include a step disposed on a front edge of said at least one support surface, a height dimension of said step being equal to the thickness of said tongues, whereby top surfaces of said tongues and said at least one support surface are coplanar when said tongues engage said steps.

2. The device according to claim 1, wherein said step is inset in said support surface.

3. The device according to claim 2, further comprising a ledge for supporting said tongues thereon when said tongues are not supported by said steps.

4. The device according to claim 3, further comprising a proximity switch operatively associated with said hinged portion for detection proximity of said support surface from said hinged portion.

5. The device according to claim 1, further comprising a ledge for supporting said tongues thereon when said tongues are not supported by said stops.

6. The device according to claim 5, further comprising a proximity switch operatively associated with said hinged portion for detection proximity of said support surface from said hinged portion.

7. The device according to claim 1, further comprising a proximity switch operatively associated with said hinged portion for detection proximity of said support surface from said hinged portion.

8. A device for transferring containers to and from at least one support surface comprising:

a transfer table having a top planar section having a hinged marginal portion at one end and a planar portion at a remaining end; and means for moving said transfer table relative to said at least one support surface, wherein said hinged portion is pivotable about an axis parallel to an edge of said planar portion and in which said hinged portion includes a plurality of independently pivotable tongues, each said tongue being pivotable about said axis for aligning with a corresponding edge of said at least one support surface to allow the transfer of containers between said transfer table and said at least one support surface when said moving means moves said transfer table, at least one support surface having a plurality of stops that align with said plurality of tongues, and in which said stops include a step disposed on a front edge of said at least one support surface, a height dimension of said step being equal to the thickness of said tongues, whereby top surfaces of said tongues and said at least one support surface are coplanar when said tongues engage said steps.

9. The device according to claim 8, further comprising a ledge for supporting said tongues thereon, when said tongues are not supported by said stops.

10. The device according to claim 9, further comprising a proximity switch operatively associated with said hinged portion for detection proximity of said support surface from said hinged portion.

11. The device according to claim 8, further comprising a proximity switch operatively associated with said hinged portion for detection proximity of said support surface from said hinged portion.

* * * * *